Nov. 4, 1930. E. DE MOULIN 1,780,225
CAMERA TRIPOD
Filed Nov. 9, 1928
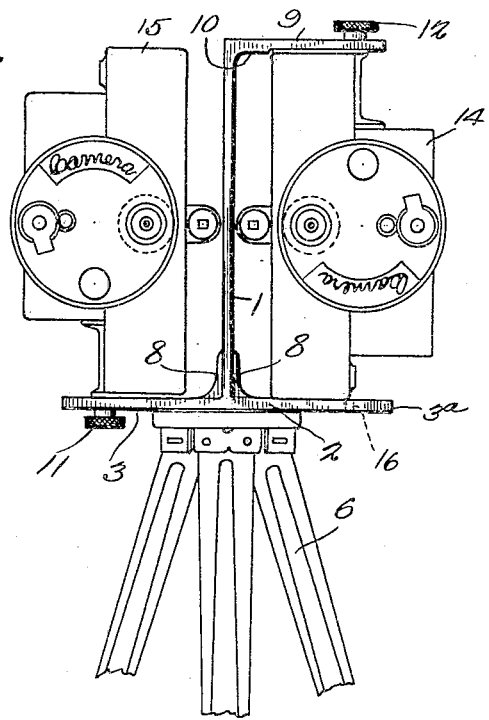
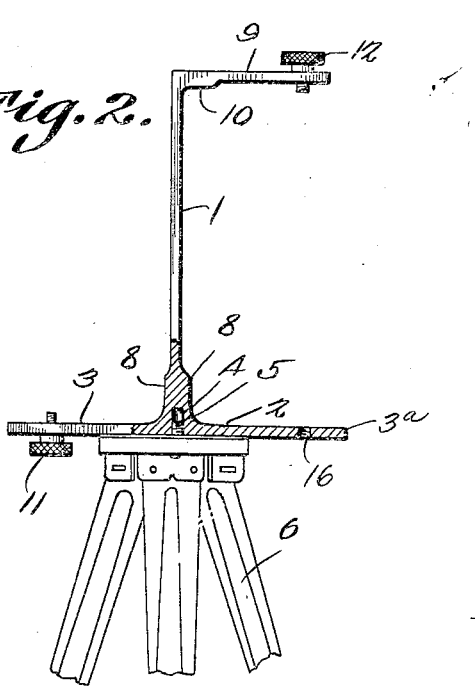
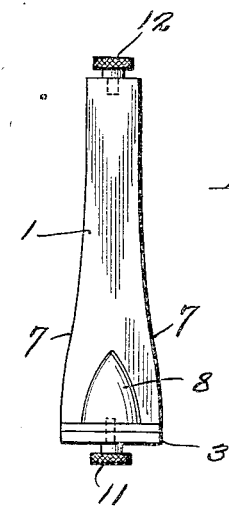
Edmond De Moulin
Inventor
By C. A. Snow & Co.
Attorneys Patented Nov. 4, 1930

1,780,225

UNITED STATES PATENT OFFICE

EDMOND DE MOULIN, OF LOS ANGELES, CALIFORNIA

CAMERA TRIPOD

Application filed November 9, 1928. Serial No. 318,240.

This invention aims to provide a simple means whereby two motion picture cameras may be held, one in erected position, and one in inverted position, on a tripod, such an arrangement being desirable in the making of trick motion pictures of various kinds.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in elevation, a device constructed in accordance with the invention in working position on a tripod;

Fig. 2 is a view similar to Figure 1, the camera having been removed, and parts being in sections;

Fig. 3 is an elevation of the device per se which forms the subject matter of this application.

In carrying out the invention, there is provided a support, preferably made of metal, and including a standard 1 which is vertically disposed when it is in use, as shown in Figure 1. The standard 1 is fixed to a disk-like base 2 from which project lower arms 3 and 3ª. The arm 3 is arranged at right angles to the standard 1. In the base 2 and in the lower end of the standard 1 there is a socket 4 into which is threaded the usual attaching screw 5 on a tripod 6, the construction being such that the standard 1 may be held on the head of the tripod in a position that is vertical, or more or less inclined, depending on the nature of the work and the position of the camera considered relatively to the subject which is being photographed. For the sake of strength, the standard 1 is widened toward its lower end, as shown at 7. Buttresses 8 connect the lower end of the standard 1 with the base 2 and give room for the socket 4 without weakening the device.

An upper arm 9 projects from the upper end of the standard 1, the arm 9 being disposed at right angles to the standard. The arms 9 and 3 extend from the standard 1 in opposite directions. For strength, the upper arm 9 may be thickened somewhat, as shown at 10, where it joins the standard 1.

By means of a securing device 11, such as a screw, a camera 15 may be mounted in erected position on the arm 3, and by means of a securing device 12, a camera 14 may be hung in suspended and vertical position from the arm 9. The reason for this arrangement of cameras is well known to those skilled in the making of motion pictures, and the simple structure which forms the subject matter of this application affords a means whereby cameras may be mounted and held, as and for the purpose hereinbefore described. Should the operator wish to swing the camera sidewise, this can be done by slacking away a little the securing devices 11 and 12 which are mounted, respectively, in the arms 3 and 9.

Sometimes it is desirable to use the inverted camera 14 alone. Then the attaching screw 5 in the tripod 6 is engaged in a hole 16 in the arm 3ª. This is done to bring the center of mass of the single camera over the center of the tripod and thereby obviate any tendency for the tripod to topple over sidewise.

What is claimed is:—

1. In a holder for motion picture cameras, a support including a standard, means for mounting the support on a tripod with the standard in a substantially upright position, said standard being provided near its upper end with a laterally extended arm, the standard being provided near its lower end with a laterally extended arm, the arms projecting in opposite directions with respect to the standard, and a camera-holding means on each arm.

2. In a holder for motion picture cameras, a support including a standard, means for mounting the support on a tripod with the standard in a substantially upright position, said standard being provided near its upper end with a laterally extended arm, the standard being provided near its lower end with a laterally extended arm, the arms projecting in opposite directions with respect to the standard, a camera-holding means on each arm, and a third arm projecting from the standard in alignment with the second specified arm, and in approximate parallelism to the first specified arm, the third arm being provided adjacent to its outer end with means for engaging a tripod, and means at the juncture of the third arm and the second specified arm, and in alignment with the standard, for engaging a tripod.

In testimony that I claim the foregoing as my own, I have hereto affixed my signature.

EDMOND DE MOULIN.